United States Patent [19]

Bertolini

[11] Patent Number: 4,580,805

[45] Date of Patent: Apr. 8, 1986

[54] EXTENDABLE CONTAINER CHASSIS FOR TRUCKS

[75] Inventor: William A. Bertolini, Montague, N.J.

[73] Assignee: Titan, Inc., Montgomeryville, Pa.

[21] Appl. No.: 674,100

[22] Filed: Nov. 23, 1984

[51] Int. Cl.⁴ .......................................... B62D 53/06
[52] U.S. Cl. ............................. 280/405 A; 280/80 B; 280/656
[58] Field of Search ................. 280/656, 80 B, 405 R, 280/405 A, 405 B; 180/209, 271; 105/393; 308/6 C

[56] References Cited

U.S. PATENT DOCUMENTS

| | | | |
|---|---|---|---|
| 1,248,037 | 11/1917 | Thompson et al. | 280/81 R |
| 2,119,800 | 6/1938 | Tull | 280/106 |
| 2,741,489 | 4/1956 | Bigge | 280/44 |
| 2,796,266 | 6/1957 | Sells | 280/29 |
| 2,962,295 | 11/1960 | Tenebaum | 280/80 B |
| 3,087,741 | 4/1963 | De Lay | 280/81 |
| 3,175,717 | 3/1965 | Smith | 280/80 B |
| 3,177,002 | 4/1965 | Schmidt | 280/80 B |
| 3,181,914 | 5/1965 | Humes | 280/80 B |
| 3,239,274 | 3/1966 | Weiss | 298/17 |
| 3,685,853 | 8/1972 | Goldsmith | 280/81 R |
| 3,734,529 | 5/1973 | Selby | 280/80 B |
| 3,895,818 | 7/1975 | Fearon | 280/81 R |
| 4,033,625 | 7/1977 | Fikse | 280/80 B |
| 4,286,797 | 9/1981 | Mekosh, Jr. et al. | 280/80 B |
| 4,405,185 | 9/1983 | Oetjen | 308/6 C |
| 4,442,915 | 4/1984 | Steel | 180/271 |
| 4,461,518 | 7/1984 | Tanaka | 308/6 C |

Primary Examiner—David M. Mitchell
Assistant Examiner—Eric D. Culbreth
Attorney, Agent, or Firm—Arthur A. Jacobs

[57] ABSTRACT

An extendable truck trailer chassis having a movable rear section or extension. The extension is equipped with a gear rack whose teeth are adapted to mesh with teeth of an idler pinion which is mounted on the main frame and is, in turn, in mesh with a similar gear rack on a cradle carried on the chassis. With the cradle located at the rear of the frame, and the extension in its withdrawn position, the container is at the rear end of the chassis for unloading and loading. The sliding extension is adapted to be moved aft by any desired means to make the chassis longer. As the extension moves aft, its rack activates the pinion and this moves the cradle and its rack forward by a similar distance.

8 Claims, 4 Drawing Figures

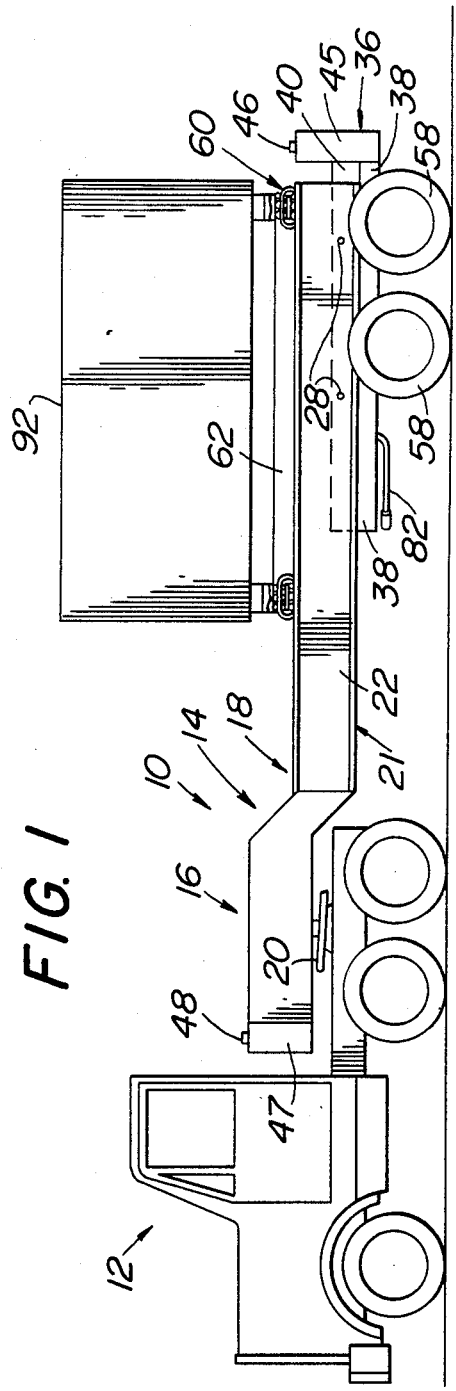
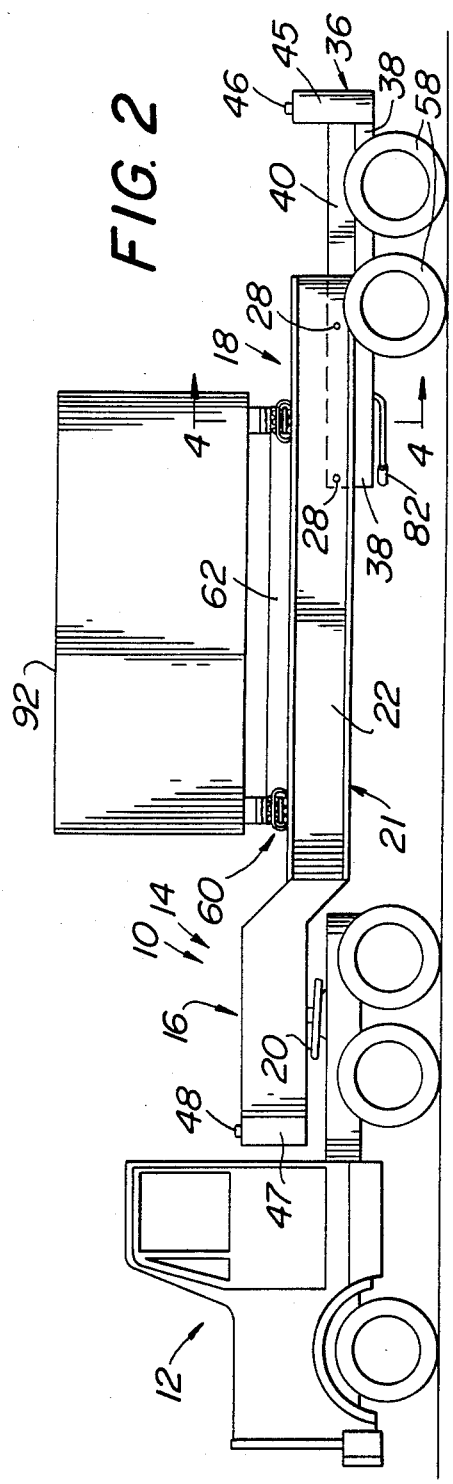

EXTENDABLE CONTAINER CHASSIS FOR TRUCKS

PRIOR ART

The following U.S. patents appear to be the most pertinent to the present invention:
U.S. Pat. No. 4,033,625
U.S. Pat. No. 3,685,853
U.S. Pat. No. 2,962,295
U.S. Pat. No. 3,087,741
U.S. Pat. No. 3,895,818
U.S. Pat. No. 3,239,274
U.S. Pat. No. 2,796,266
U.S. Pat. No. 2,734,529
U.S. Pat. No. 2,119,800
U.S. Pat. No. 1,248,037
U.S. Pat. No. 2,741,489
U.S. Pat. No. 3,181,914

This invention relates to truck trailers, and it particularly relates to a truck trailer having an extendable chassis for cargo containers.

Truck trailer chassis equipment in the United States have heretofore generally been designed to carry either one or another of two standard size intermodal cargo containers, namely either 20 foot or 40 foot containers.

The gross weight of the 20 foot container has always been about 44,800 pounds and the 40 foot container has been about 67,200 pounds. Even though some states and the federal government have vehicle weight laws which tie the wheelbase of the vehicle to its carrying capacity, it has never heretofore been a problem because the lower rating of the 20 foot container is low enough to comply with the capacity restrictions imposed on the chassis by its short wheelbase. However, in recent years there has been a marked growth of "super" 20 foot containers with a gross weight rating of about 53,760 pounds (24 tons). When these smaller but heavier, containers are placed on a short chassis, the chassis does not have the legal capacity to carry the load.

Load capacity can be increased by extending the wheelbase; however, the container has to be essentially centrally mounted to insure proper distribution of weight to the tractor and trailer tandem axles and this results in a large area at the rear end of the chassis which would have to be decked in order to permit a lift truck to load and unload the container. This poses several problems, some of which are concerned with the safety aspect of the deck. Another disadvantage is the inability to secure a "collar" to the rear of the container, so that a heat seal is established between the building door opening and the container when the vehicle is backed up to the loading door.

It is, therefore, an object of the present invention to overcome the above and other problems by providing a truck trailer chassis that can be readily adjusted from one length wherein the load is substantially centrally mounted during movement of the vehicle to another length wherein the load may be positioned adjacent the rear to accomodate loading and unloading while the vehicle is at rest.

Another object of the present invention is to provide a truck trailer chassis of the above type which may be adjusted from one length to another either manually or by motor power.

Another object of the present invention is to provide a truck trailer chassis of the above type wherein adjustment is obtained with a minimum of friction and avoidance of brinneling of the support surface.

Another object of the present invention is to provide a truck trailer chassis of the above type where the adjustment means is relatively simple in construction and easy to operate.

Other objects and many of the attendant advantages of the present invention will be readily appreciated as the same becomes better understood by reference to the following description when read in conjunction with the accompanying drawings wherein:

FIG. 1 is a side elevational view of a truck assembly having a trailer embodying the present invention, with the chassis in retracted position, and with parts broken away to show the roller chain dollies.

FIG. 2 is a side elevational view similar to FIG. 1, but with the chassis in extended position.

Figure 3:
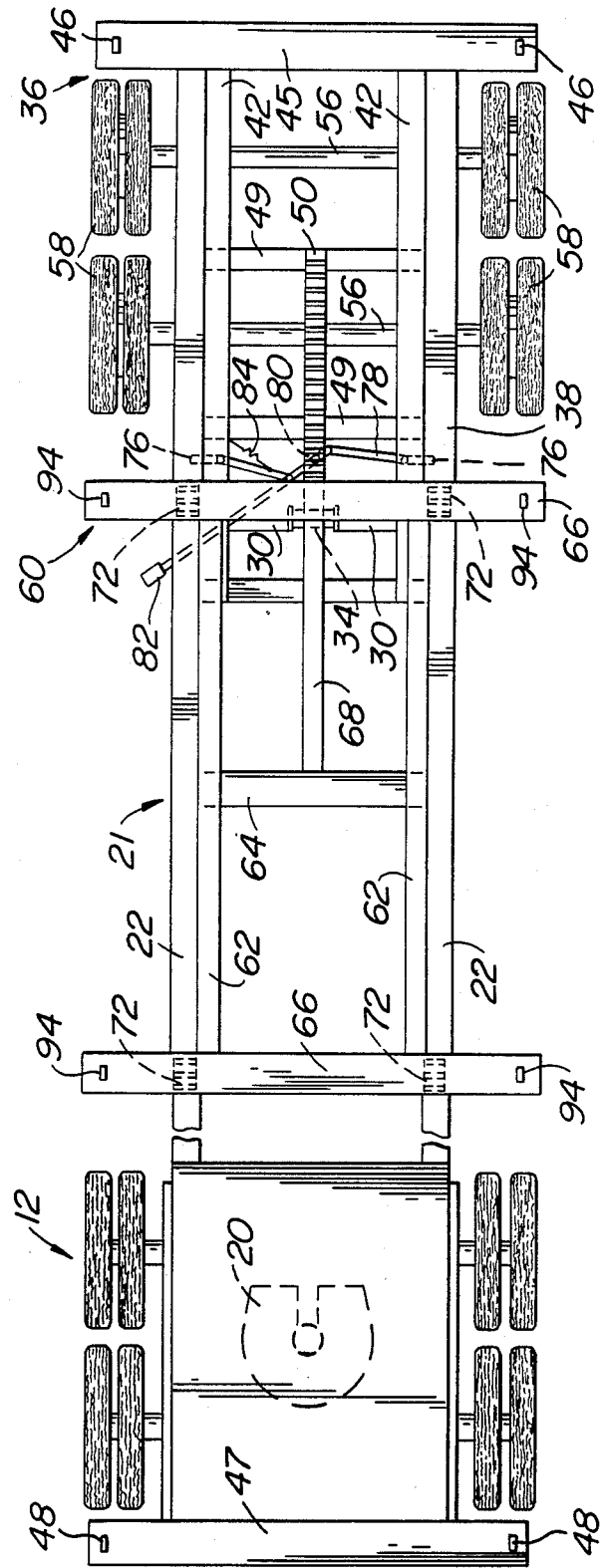
FIG. 3 is a top plan view of the truck assembly of FIG. 1 in the extended position.

In accordance with the present invention there is provided a 40 foot gooseneck-type chassis with a cradle to support the container. This cradle is movable along the top of the chassis and enables a "super" container to be carried centrally for over-the-road movements in a manner to comply with the state and federal regulations; yet it can be single-handedly moved from the center position to the rear position for loading and unloading.

The forward and rearward twistlocks on the cradle are retractable types and can be lowered when the empty cradle is placed in the rear position; this permits the cradle to carry a 40 foot tunnel container, is so desired. It is also possible, by using an elevated stanchion forward of the cradle front bolster, which is rotated manually into position, for the chassis to carry two 20 foot containers.

The cradle is locked in its forward or after position by means of spring-loaded pin locks, whereby the transmission of excessive loads to the transfer mechanism itself is avoided. In addition, air release valves may be provided in the locking pin holes in such a manner as to keep the air system open when the pin is not in its locking position, which, in turn, automatically applies the brakes and prevents movements of the vehicle.

The cradle is supported by and rides on four roller-chain dollies which operate on the top flange of the chassis main beam. These roller dollies enable low friction movement; but, because of their multi-roller support, brinneling of the support surface does not occur as sometimes occurs with single roller or single wheel designs.

Movement of the cradle is accomplished by a pinion fixed on the chassis. The fully loaded cradle can be moved by the tractor during shifting operation or it can be powered by an air or electric motor, either of which may be powered by the truck tractor. The air system may utilize conventional glad-hand connectors while the electrical system may obtain its power through the conventional tractor/trailer interchange electrical plug. Manual operation may also be provided. Other methods of operation are also possible, such as by the use of winching or powered rollers.

Referring in greater detail to the drawings wherein similar reference characters refer to similar parts, there is shown a truck assembly, generally designated 10, comprising a tractor, generally designated 12 and a trailer, generally designated 14.

The tractor 12 is of any conventional type while the trailer 14 is of the gooseneck type that includes a forward neck section 16 and an aft chassis section 18. The neck section is releasably connected to the tractor 12 by a fifth wheel assembly 20.

The chassis section 18 comprises a main frame 21 consisting of laterally-spaced parallel beams or rails 22, each of which has an upper transverse flange 24 and a lower transverse flange 26. A pair of apertures 28 are linearly spaced from each other adjacent the rear portion of each rail 22. Extending inwardly from each rail 22 is a bar 30 between the inner ends of which is journaled on shaft 32 upon which is rotatably mounted a pinion 34.

Longitudinally slidable relative to the main frame formed by the rails 22 is an extension section 36 formed by a pair of laterally-spaced, parallel beams 38 of generally hollow square cross-section. Each of these beams 38 is provided with an upstanding plate 40 on its inner side, each of these plates extending above the top of its corresponding beam 38 and each being provided at its upper end with an inwardly-extending flange 42. Apertures 44 are provided in the plates 40 which are adapted to selectively mate with the apertures 28 during sliding adjustments of the extension section 36. A transverse support bar 45 is connected between the aft ends of the beams 38 and is provided with rotatable rectangular locking lugs 46 which are adapted to fit into corresponding rectangular slots in the bottom of a container and then rotated into a transverse position relative to the slots to lock the container in place. A similar transverse support bar 47, having similar locking lugs 48, is provided at the front end of the neck section 16.

Extending between the median portions of the beams 38 are cross-bars 49 which support a longitudinally-extending rack 50 having upwardly extending teeth adapted to engage the pinion 34; while depending from the bottom of each of the beams 38 are a pair of longitudinally spaced shackles 51 having shafts 52 supporting leaf spring hangers 54. Extending between each pair of oppositely-disposed hangers 54 is an axle 56 which supports a double wheel 58 at each end.

Movably positioned on the main frame 21 is a cradle 60 that comprises a pair of laterally-spaced, parallel beams or rails 62 connected by a cross-bar 64. At their opposite ends, the rails 62 are connected to cross-support members 66, each of which extends laterally outward from the rails 62 on each side. Depending from the cross-bar 64 is a rack 68 having downwardly-extending teeth which are adapted to mesh with the pinion 34.

Figure 4:
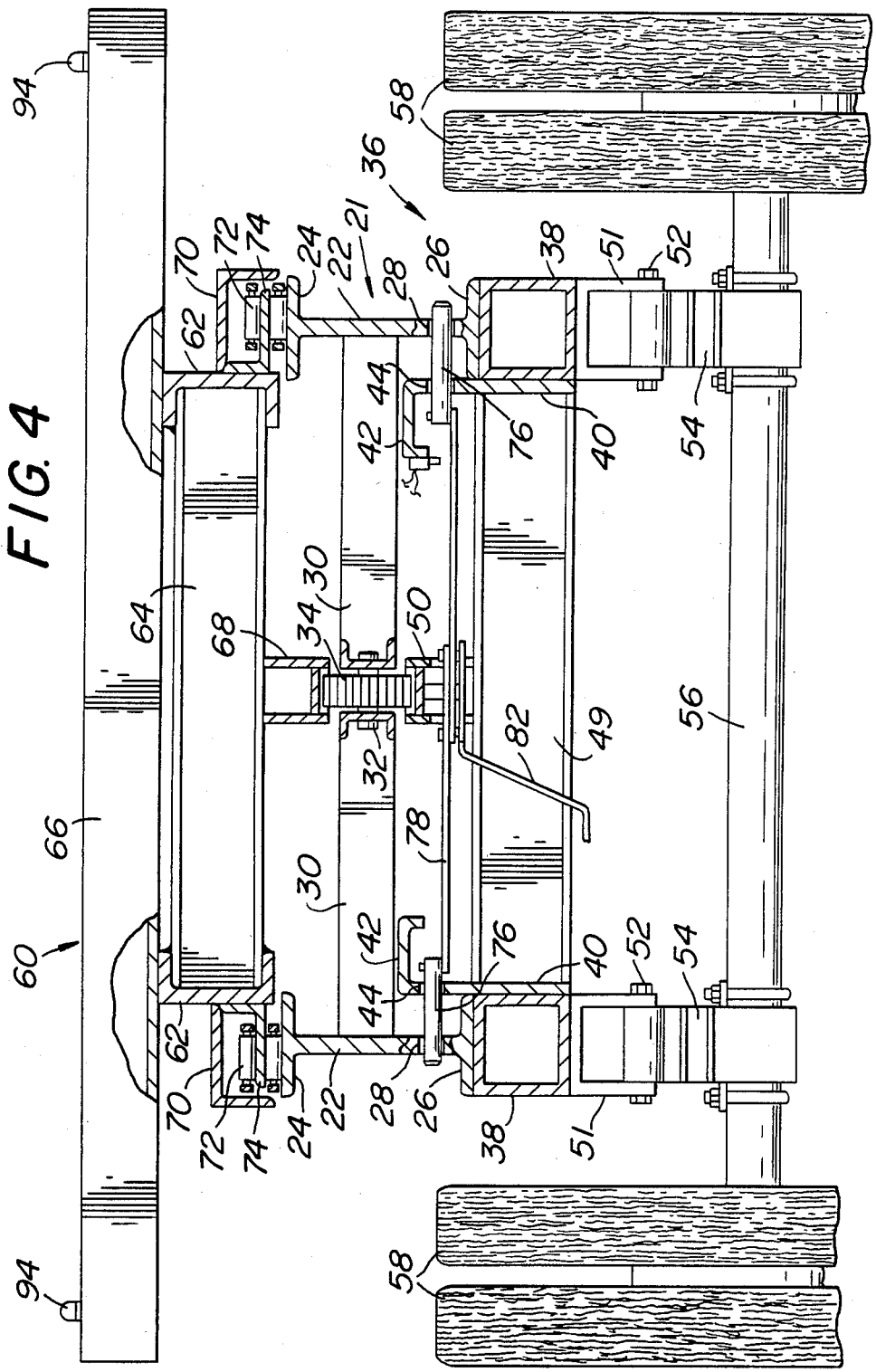
FIG. 4 is a sectional view taken on line 4—4 of FIG. 2.

Extending laterally outward from the respective rails 62 (as best seen in FIG. 4) are housings 70 enclosing respective roller chain dollies 72 extending around lateral flanges 74 on the rails 62. These dollies 72 ride on the flanges 24 of the rails 22 when the cradle 60 moves relative to the main frame 21, thereby providing a low-friction movement.

As previously stated, movement of the cradle can be effected by the tractor during shifting operation (i.e., by driving the truck). However, as the extension section 36 is moved in one direction, the pinion 34 is rotated by the rack 48 and, thereupon, acts on the rack 68 to move the cradle 60 in the opposite direction for an equivalent distance. In this manner, the cradle can be adjusted in either direction from or to a position where it is either adjacent the rear end of the trailer chassis (as in FIG. 1) or where it is centrally located relative to the chassis (as in FIG. 2).

In order to maintain the extension section 36 in either of its adjusted positions, there are provided a pair of pins 76 adapted to extend through corresponding apertures 28 and 44 when these apertures are in mating position. These pins 76 are operated by a linkage assembly 78 pivoted at 80 to the rack 48 and operated by a lever 82. The linkage 78 is based by a spring 84 (see FIG. 3) into a position wherein the pins are held securely within the mating apertures.

The load, here shown as a container 92, is held in position either on the support bars 45 and 47 or on the cradle 60 by means of rotatable rectangular locking lugs 94, similar to the lugs 46 and 47, that are positioned adjacent the ends of the support members 66. This locking method is illustrative since any other desired means for holding the load in place may be used.

The invention claimed is:

1. An extendable truck trailer chassis comprising a main frame section and an adjustable extension section, said extension section being longitudinally movable relative to said main section, a load-carrying cradle movably mounted on said main section for longitudinal movement relative to said main section, means on said extension section and on said cradle for moving said cradle in the reverse direction from the movement of said extension section when said extension section is moved relative to said main section, and means to hold said main section and extension section in adjusted positions relative to each other, said means on said extension section and on said cradle for moving said cradle in the reverse direction from the movement of said extension section comprising a rack on said extension section having teeth extending in one direction, a rack on said cradle having teeth extending in the opposite direction, and an idler pinion positioned between and in mesh with the teeth of both said racks.

2. The device of claim 1 wherein the means to hold said main section and extension in adjusted positions comprise apertures in said main section, apertures in said extension section adapted to selectively mate with the apertures in said main section upon relative movement of said sections, and pins movable into said mating apertures, said pins having operating means to move said pins into and out of said mating apertures.

3. The device of claim 2 wherein said pins are resiliently biased into positions within said mating apertures.

4. The device of claim 1 wherein said extension section is movable by power means.

5. The device of claim 1 wherein said cradle is movable on said main section by means of roller chain dollies.

6. A vehicle comprising, in combination, a truck tractor and trailer releasably connected to each other, wheels on said tractor coacting with wheels on said trailer to movably support said vehicle, said trailer comprising a main chassis frame section and an adjustable extension section, said extension section being longitudinally movable relative to said main section, a cradle movably positioned on said main section and overlying said extension section, interconnecting means between said extension section and said cradle for moving said cradle in a reverse direction from the movement of said extension section when said extension section is moved relative to said main section, said interconnecting means comprising a longitudinal rack on said extension section, a longitudinal rack on said cradle and an idler pinion between and in mesh with both said racks.

7. The vehicle of claim 6 wherein there are means on said trailer for actuating the brakes on said vehicle while said extension section is being adjusted relative to said main section.

8. The vehicle of claim 7 wherein said cradle is movable by power means.

* * * * *